Patented July 19, 1949

2,476,422

UNITED STATES PATENT OFFICE 2,476,422

STABILIZED VINYL RESIN COMPOSITION

Robert I. Leininger, Springfield, Mass., assignor to Monsanto Chemical Company, St. Louis, Mo., a corporation of Delaware No Drawing. Application January 26, 1946, Serial No. 643,740

8 Claims. (Cl. 260—45.75)

This invention relates to the stabilization of vinyl resins. More particularly, this invention relates to preventing the deterioration of halogen-containing vinyl resins.

It is an object of this invention to provide halogen-containing vinyl resin compositions having improved resistance to deterioration on aging. A particular object of this invention is to provide halogen-containing vinyl resin compositions having increased resistance to discoloration at elevated temperatures.

These and other objects are accomplished according to this invention by incorporating a mixture of 2-phenyl-indole and dibutyl diphenyl tin in a halogen-containing vinyl resin.

The following examples are illustrative of the products of the invention, but are not to be construed as limitative thereof. Where parts are mentioned, they are parts by weight.

EXAMPLE I

A mixture of 100 parts of polyvinyl chloride, 50 parts of dioctyl phthalate, one part of stearic acid, 0.5 part of 2-phenyl-indole and 0.5 part of dibutyl diphenyl tin was milled on hot mixing rolls at a temperature of 135–140° C. for about 5 minutes to form a homogeneous, colorless composition. From this composition are molded sheets about 0.030 inch in thickness by subjecting the composition to pressure in a suitable mold at a temperature of about 160° C. for about 1 minute. The resulting sheets are transparent and substantially free from discoloration.

In order to further illustrate the unexpected results obtained by employing a mixture of 2-phenyl-indole and dibutyl diphenyl tin for the purpose of stabilizing halogen-containing vinyl resins, a series of compositions are prepared in the same manner as the composition described above, except that in composition A no stabilizer is used, in composition B the stabilizer of Example I is replaced by an equal amount of 2-phenyl-indole as the sole stabilizer and in composition C the stabilizer of Example I is replaced by an equal amount of dibutyl diphenyl tin as the sole stabilizer. Sheets are molded from these compositions in the same manner as in Example I and the discoloring effect of heating the sheets at 160° C. is compared with the results from heating the sheets of Example I. It is found that the composition of Example I is unexpectedly superior not only to composition A but also to compositions B and C described above. The surprising advantage of the composition of Example I is illustrated by comparing the light transmission results before and after heating for two hours. These results are tabulated below in Table I. The light transmission values are obtained according to A. S. T. M. method D–672–44T.

Table I

| Stabilizer | Parts (per 100 parts of polymer) | Percent Light Transmission after heating at 160° C. for the indicated time in hours | |
|---|---|---|---|
| | | 0 | 2 |
| None | | 87 | 47.5 |
| 2-phenyl indole | 1.0 | 89.7 | 65 |
| Dibutyl diphenyl tin | 1.0 | 90 | 46 |
| 2-phenyl indole | 0.5 | 91 | 75 |
| Dibutyl diphenyl tin | 0.5 | | |

EXAMPLE II

Example I is repeated except that instead of polyvinyl chloride a copolymer of vinyl chloride and vinyl acetate containing about 88% of vinyl chloride is used and the stabilizer is a mixture of 0.75 part of 2-phenyl indole and 0.75 part of dibutyl diphenyl tin. The resulting composition exhibits a resistance to discoloration on heating somewhat superior to that of the product described in Example I.

EXAMPLE III

Example I is repeated except that the polyvinyl chloride is replaced by an equal amount of a heteropolymer of vinyl chloride and diethyl maleate containing about 90% vinyl chloride and the stabilizer consists of a mixture of 0.05 part of 2-phenyl indole and 0.1 part of dibutyl diphenyl tin. The heat resistance of the resulting composition is even better than that of the product described in Example I.

It is apparent from the foregoing results that surprising and greatly improved effects are obtained by using a mixture of dibutyl diphenyl tin and 2-phenyl indole in place of the individual compounds in producing transparent and heat stable halogen-containing vinyl resin compositions. Among other advantages, the use of the stabilizer of the invention permits halogen-containing vinyl resins to be processed into sheets and other articles without discoloration.

In place of the resins used in the examples, similar improvements may be effected by incorporating the mixed stabilizer of the invention in other halogen-containing vinyl resins, numerous examples of which are well-known to those skilled in the art. Examples of vinyl compounds from which such resins may be made include vinyl chloride, vinylidene chloride, vinyl chloracetate, chlorostyrenes, chlorobutadiene, etc.

Such vinyl compounds may be polymerized singly or in admixture with these or other halogen-containing vinyl compounds or with vinyl compounds free from halogen, such as vinyl acetate, methyl acrylate, methyl methacrylate, styrene, etc. The mixed stabilizer of the invention is particularly effective with heteropolymers of vinyl chloride and diethyl maleate or other esters of maleic or other alpha, beta-unsaturated polycarboxylic acids such as fumaric acid, citraconic acid, aconitic acid, etc. The proportion of vinyl chloride in the copolymers or heteropolymers may be substantially varied but usually amounts to 50% or more of the polymeric product.

The mixed-stabilizer of the invention is also effective when intimately mixed with halogen-containing resins in which part or all of the halogen is introduced into preformed resin, e. g., chlorinated polyvinyl acetate, chlorinated polystyrene, chlorinated polyvinyl chloride and the like. Usually chlorine is introduced into the preformed resin by treatment in the presence of a softening agent for the resin.

The stabilizer mixture of the invention is also effective in vinyl resins containing halogens other than chlorine, e. g., bromine.

The amount of the mixed stabilizer of the invention that is used in halogen-containing vinyl resins may be substantially varied, depending upon the use to which the product is to be placed and other factors familiar to those skilled in the art. However, it is generally found that between 0.5 and 5 parts of the stabilizer mixture per 100 parts of the halogen-containing vinyl resin are desirable. In making up the mixed stabilizer, the proportion of each component should amount to at least 25% of the sum of the two components.

It is, of course, understood that in place of dioctyl phthalate, other plasticizers may be used in varying amounts depending upon the nature of the vinyl polymerizate and the use for which it is designed. In certain cases, it may be desirable to eliminate the plasticizer entirely. In place of stearic acid, other lubricants may be included to facilitate molding, calendering and like operations. For some purposes and/or in some types of compositions, it may be desirable to avoid the use of any type of lubricant.

It is to be understood that the above description is given by way of illustration only, and not of limitation, and that deviations are possible within the spirit of the invention.

What is claimed is:

1. A composition comprising polyvinyl chloride and, as a stabilizer therefor, a mixture of 0.5–1.0 part of 2-phenyl indole and 0.5–1.0 part of dibutyl diphenyl tin for every 100 parts of polyvinyl chloride.

2. A composition resistant to the discoloring effects of heat comprising a halogen-containing resin in which the halogen is from the group consisting of chlorine and bromine and as a stabilizer therefor, 0.5–5 parts by weight of a mixture of 2-phenyl indole and dibutyl diphenyl tin for every 100 parts by weight of said resin, each component of the stabilizer being present in an amount at least equal to 25% of the sum of the two components on a weight basis.

3. A composition as defined in claim 2 in which the halogen-containing resin is a vinyl halide-containing resin.

4. A composition resistant to the discoloring effects of heat comprising a chlorine-containing vinyl resin and, as a stabilizer therefor, 0.5–5 parts by weight of a mixture of 2-phenyl indole and dibutyl diphenyl tin for every 100 parts by weight of said resin, each component of the stabilizer being present in an amount at least equal to 25% of the sum of the two components on a weight basis.

5. A composition as defined in claim 4 in which the chlorine-containing vinyl resin is a vinyl chloride-containing resin.

6. A composition as defined in claim 4 in which the chlorine-containing vinyl resin is polyvinyl chloride.

7. A composition as defined in claim 4 in which the vinyl chloride-containing resin is a copolymer of vinyl chloride and diethyl maleate.

8. A composition as defined in claim 4 in which the vinyl chloride-containing resin is a vinyl chloride-vinyl acetate copolymer.

ROBERT I. LEININGER.

REFERENCES CITED

The following references are of record in the file of this patent:

UNITED STATES PATENTS

| Number | Name | Date |
| --- | --- | --- |
| 2,267,779 | Yngve | Dec. 30, 1941 |
| 2,307,157 | Quattlebaum et al. | Jan. 5, 1943 |